(No Model.)
P. J. PURDY.
APPARATUS FOR RESEATING VALVES, BORING CYLINDERS, &c.
No. 603,577. Patented May 3, 1898.
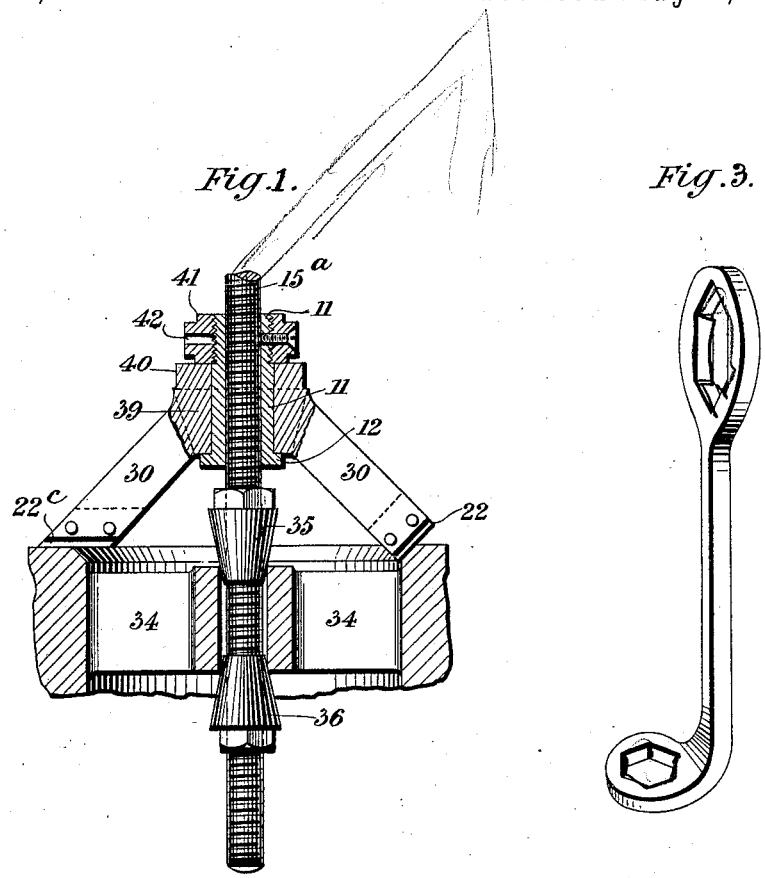
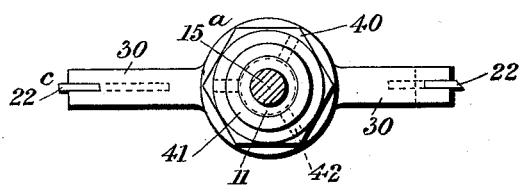
WITNESSES.
INVENTOR.
Percival J. Purdy,
by Wilkinson & Fisher,
Attorneys

UNITED STATES PATENT OFFICE.

PERCIVAL JOHN PURDY, OF MANCHESTER, ENGLAND.

APPARATUS FOR RESEATING VALVES, BORING CYLINDERS, &c.

SPECIFICATION forming part of Letters Patent No. 603,577, dated May 3, 1898.

Application filed March 21, 1898. Serial No. 674,647. (No model.)

*To all whom it may concern:*

Be it known that I, PERCIVAL JOHN PURDY, a subject of the Queen of Great Britain, residing at Manchester, England, have invented certain new and useful Improvements in Apparatus for Repairing Valve-Seats, of which the following is a specification.

At the present time there are several forms of apparatus on the market adapted, more or less successfully, to repair valve-seats *in situ*. These forms of apparatus, generally speaking, comprise a chuck adapted to engage with the interior of the valve-casing and central spindle carrying a suitably-shaped cutting or facing tool and means for feeding or rotating such tool.

My invention relates to improvements in apparatus especially designed for repairing valve-seats where the opening to be repaired is provided with cross-bars; and my invention consists in the construction and combination of parts, as hereinafter described and claimed.

In the accompanying drawings, Figure 1 is a view in cross-section of my apparatus. Fig. 2 is a plan view of the same. Fig. 3 is a perspective view of a spanner employed with this apparatus.

34 represents the cross-bars of a valve-seat having a central opening to carry the spindle of the valve. The apparatus for reseating or facing the valve-seat is secured between said cross-bars in the following manner: A screw-threaded spindle $15^a$ passes through the opening between the cross-bars and is provided with two internally-screw-threaded nuts 35 and 36, which are conical on their outer surfaces and have these conical faces arranged opposite to each other. These conical nuts fit in the opening from either end, the lower one being held in place (while the spindle is screwed into it) by means of the lower end of the spanner shown in Fig. 3. The spindle carries an internally-screw-threaded sleeve 11, having a flange 12 on its lower portion, which flange supports the boss 39 of the downwardly-projecting arms 30, which carry cutters $22^c$, adapted to face the flat outer surface of the valve-seat, or angular cutters 22, adapted to cut the conical seat for the valve, as may be required. The boss 39 is capable of free revolution on the sleeve 11, and it carries a square or polygonal head or nut 40 for engagement with the upper end of the spanner shown in Fig. 3, by which the cutters may be revolved when the apparatus is operated. It is obvious that any form of crank-handle, fixed or removable, might be used instead of this spanner. A collar 41 is pinned or screwed to the upper end of the sleeve 11 and has openings 42, adapted to receive a rod or tool, so that it may be fed when desired. It may, however, be arranged to receive a spanner instead of being operated by a rod or tool.

The operation of the device will be evident without further explanation.

Having thus described my invention, what I claim as new, and desire to secure by Letters Patent of the United States, is—

1. In an apparatus for repairing valve-seats, in which the proper center is determined by the hole for the valve-stem, the combination of a threaded spindle, oppositely-set nuts for holding said spindle in position, a hollow stem or casing through which the spindle passes, cutting-arms carried on said stem, and means for feeding said cutters down said spindle, substantially as described.

2. In an apparatus for repairing valve-seats, in which the proper center is determined by the hole for the valve-stem, the combination of a threaded spindle, oppositely-set conical nuts for holding said spindle in position, an internally-threaded hollow stem or casing engaging said spindle, a boss provided with cutting-arms mounted on said stem, cutters on said arms, the upper part of said stem or casing being externally screw-threaded, a nut engaging said screw-threads, and means for securing the nut, stem, and spindle together, substantially as described.

In testimony whereof I have hereunto set my hand in the presence of two subscribing witnesses.

PERCIVAL JOHN PURDY.

Witnesses:
PHILLIS BARWICK,
EMMA JACKSON.